United States Patent
Bertorelle et al.

(10) Patent No.: US 10,264,616 B2
(45) Date of Patent: Apr. 16, 2019

(54) LTE TRANSMISSION IN UNLICENSED BANDS

(71) Applicant: Sequans Communications S.A., Paris (FR)

(72) Inventors: Jerome Bertorelle, Paris (FR); Guillaume Vivier, Paris (FR)

(73) Assignee: SEQUANS COMMUNICATIONS S.A., Colombes (FR)

( * ) Notice: Subject to any disclaimer, the term of this patent is extended or adjusted under 35 U.S.C. 154(b) by 14 days.

(21) Appl. No.: 14/790,657

(22) Filed: Jul. 2, 2015

(65) Prior Publication Data
US 2016/0007378 A1    Jan. 7, 2016

(30) Foreign Application Priority Data
Jul. 4, 2014  (EP) ..................... 14306103

(51) Int. Cl.
| | | |
|---|---|---|
| H04W 74/00 | (2009.01) | |
| H04W 28/02 | (2009.01) | |
| H04W 72/04 | (2009.01) | |
| H04W 56/00 | (2009.01) | |
| H04W 24/08 | (2009.01) | |
| H04W 76/16 | (2018.01) | |
| H04W 16/14 | (2009.01) | |

(52) U.S. Cl.
CPC ........... *H04W 76/16* (2018.02); *H04W 16/14* (2013.01); *H04W 24/08* (2013.01); *H04W 28/0247* (2013.01); *H04W 56/001* (2013.01)

(58) Field of Classification Search
None
See application file for complete search history.

(56) References Cited

U.S. PATENT DOCUMENTS

| | | | | |
|---|---|---|---|---|
| 2013/0156013 A1* | 6/2013 | Huang | .................. | H04W 72/04 370/336 |
| 2013/0329711 A1* | 12/2013 | Seo | ....................... | H04J 11/0069 370/336 |
| 2014/0301351 A1* | 10/2014 | Gao | ....................... | H04W 74/08 370/329 |
| 2015/0264638 A1* | 9/2015 | Han | ....................... | H04W 48/16 370/329 |
| 2015/0264699 A1* | 9/2015 | Fwu | ....................... | H04L 5/0001 370/329 |
| 2015/0327233 A1* | 11/2015 | Liu | ................... | H04W 56/0015 370/329 |
| 2016/0165529 A1* | 6/2016 | Jin | ........................ | H04W 48/12 370/338 |
| 2016/0308637 A1* | 10/2016 | Frenne | ................. | H04J 11/0069 |

FOREIGN PATENT DOCUMENTS

| | | | | |
|---|---|---|---|---|
| WO | WO 2014/088295 | 6/2014 | | |
| WO | WO 2014/089069 | 6/2014 | | |
| WO | WO-2015174748 | * 11/2015 | ............ | H04W 74/08 |

OTHER PUBLICATIONS

European Search Report for EP 14306103.4 dated Feb. 2, 2015.

* cited by examiner

*Primary Examiner* — George C Atkins
(74) *Attorney, Agent, or Firm* — Hamilton, Brook, Smith & Reynolds, P.C.

(57) ABSTRACT

A method of receiving LTE data by a user device, the data being transmitted on a channel of an unlicensed band comprising the steps of receiving a cell ID from a primary LTE cell, receiving system information from the primary LTE cell for access to an unlicensed channel, receiving LTE data on the channel of an unlicensed band.

24 Claims, 4 Drawing Sheets

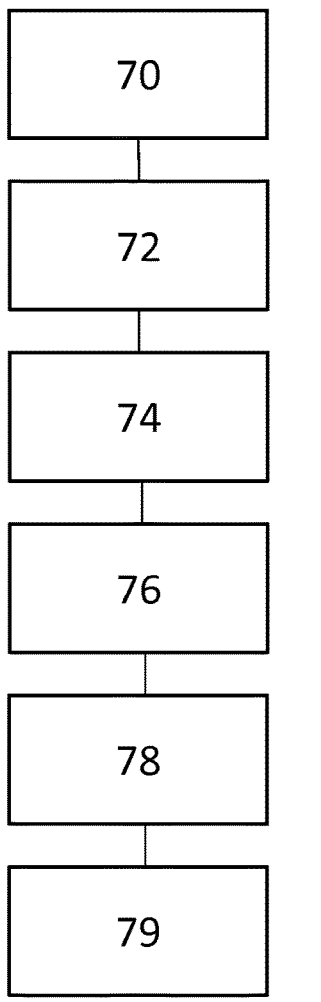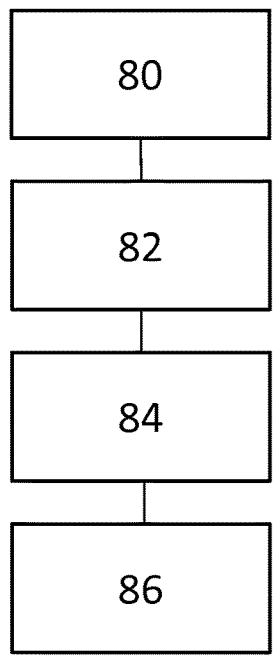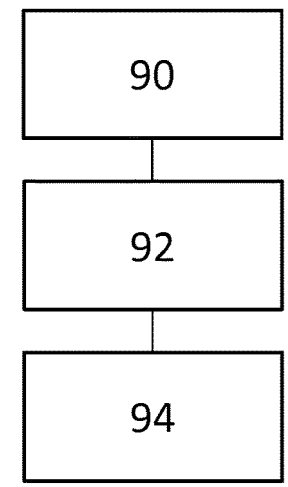
Figure 7
Figure 8
Figure 9

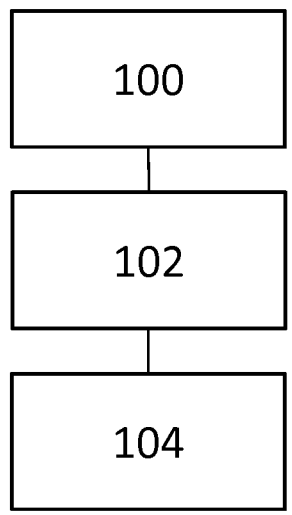
Figure 10
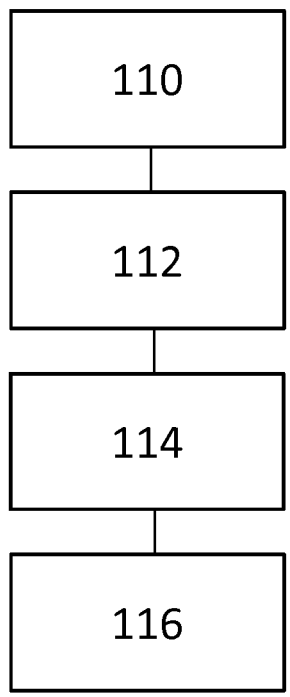
Figure 11
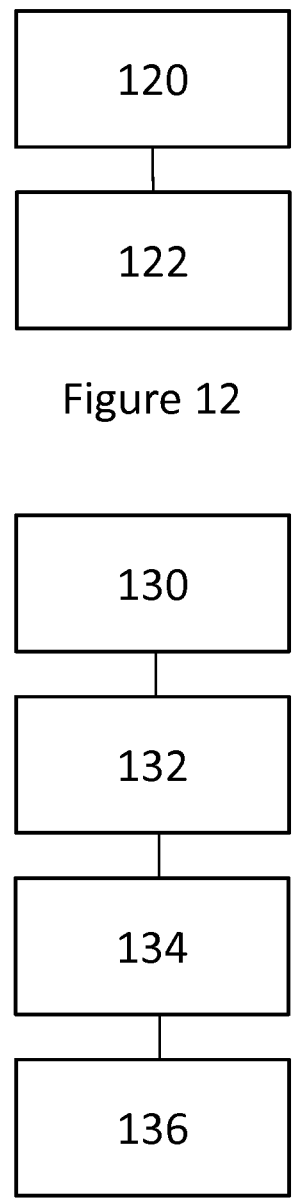
Figure 12
Figure 13

LTE TRANSMISSION IN UNLICENSED BANDS

RELATED APPLICATION

This application claims priority under 35 U.S.C. § 119 or 365 to European Application No. 14306103.4, filed Jul. 4, 2014. The entire teachings of the above application(s) are incorporated herein by reference.

FIELD OF INVENTION

This invention relates to augmenting LTE transmission in unlicensed bands. It is particularly suitable for, but by no means limited to, use with WIFI.

BACKGROUND OF THE INVENTION

LTE is a cellular system operating in licensed bands, where an operator has the exclusive usage of the allocated frequencies. The rising demand for mobile data creates the need for the use of more spectrum. A common way to increase the available spectrum is to use WiFi offloading, where instead of using the cellular network, data connectivity is provided through WiFi in unlicensed bands, and in particular the 5 GHz unlicensed spectrum.

However using WiFi for the unlicensed spectrum has several drawbacks: WiFi is not as spectrally efficient as LTE, and using WiFi requires integrating two different technologies. Some estimations put LTE as being twice as spectrally efficient as WiFi, therefore using LTE could double the available bandwidth using the same amount of spectrum resources. For this reason there is a growing interest in using LTE in unlicensed bands, which may be considered as part of LTE release 13 (the currently deployed LTE release being 9, or 10 in the most advanced deployments). For this LTE should be modified to share the unlicensed spectrum with other technologies, mainly WiFi, in a fair manner.

LTE is designed for licensed bands, so there is an assumption that an LTE channel is fully dedicated to LTE. As such, there is no current mechanism to share the spectrum with other users, and possibly other technologies. Conversely, in unlicensed bands there is a requirement to share the available capacity with other users and technologies in a fair manner.

The key principle behind this fair coexistence on an unlicensed channel is "Listen Before Talk" (LBT). With LBT, in order for a device to transmit, it will listen to the channel and only start transmission if no other transmission is on-going. However, two (or more) such devices could listen at the same time to an unused channel and decide to start transmission at the same time, leading to a collision and a failed transmission. LBT cannot avoid this issue, but is still an important mechanism to avoid collisions and share the spectrum between uncoordinated users and technologies.

Although not required, a number of technologies using unlicensed bands can start transmitting at any time, in order to quickly use the spectrum as soon as it is available.

LTE uses a completely different scheme: the channel usage is split into 1 millisecond subframes, with fixed time synchronization, and the eNodeB base station (eNB) centrally schedules the spectrum usage by explicitly allocating part of each subframe subcarriers to different devices (UE, user equipment) as would be understood by the skilled person. Typically, the eNB sends allocation order to a device over the PDCCH (Physical Downlink Control CHannel) to describe an allocation in a given subframe PDSCH or PUSCH (Physical Downlink/Physical Uplink Shared CHannels). An allocation provided by the eNB has to be used.

The LTE allocation scheme is inflexible and, as is, is not suitable to share unlicensed spectrum in a fair manner. A recently developed mechanism, carrier aggregation (CA), provides a little more flexibility in that a secondary channel can be activated/deactivated within a few milliseconds (up to 8), and so does not need to be used all of the time. A primary cell (PCell) in a licensed band combined with a secondary cell (SCell) in an unlicensed band would bring more flexibility than the regular, 'always on' LTE used on the primary cell. But once a secondary cell is activated on the license-exempt band, the regular LTE framing and eNB scheduling is used, and is still not flexible enough. It is noted that the secondary cell could be downlink (DL) only as denoted for instance in 3GPP as supplementary DL. In the context of LTE-U (referring to LTE that has been modified and extended to work in unlicensed bands), it is assumed that the secondary cells used in the license-exempt spectrum is DL only.

There is a need for a scheme to use the LTE waveform in unlicensed bands, with minimal modification on the device side to help implementation and adoption. There is also a need to make the LTE allocation more flexible when an unlicensed band is used, while preserving most of the LTE waveform and its high bandwidth efficiency.

SUMMARY OF THE INVENTION

According to a first aspect there is provided a method of receiving LTE data by a user device, the data being transmitted on a channel of an unlicensed band as defined in claim 1 of the appended claims. Thus there is provided a method of receiving LTE data by a user device, the data being transmitted on a channel of an unlicensed band comprising the steps of receiving a cell ID from a primary LTE cell, receiving system information from the primary LTE cell for access to an unlicensed channel, receiving LTE data on the channel of an unlicensed band.

Optionally, the method wherein the cell ID and system information is received as unicast data.

Optionally, the method wherein the unlicensed channel is served by a secondary LTE cell of a different eNodeB than the primary LTE cell.

Optionally, the method further comprises determining from PDCCH whether an LTE transmission subframe on the unlicensed channel is one of used, partially used or not used.

Optionally, the method wherein the user device determines one or more transmission measurements of the unlicensed channel in relation to transmission on that channel based on used and/or partially used LTE transmission subframes on the unlicensed channel.

Optionally, the method wherein the user device determines one or more channel measurements of the unlicensed channel in relation to interference and/or noise on that channel based on unused LTE transmission subframes.

Optionally, the method of claim 5 or 6 wherein the user device sends data indicative of the one or more transmission and/or channel measurements to the primary cell.

Optionally, the method wherein the user device sends its geographical position to the primary LTE cell.

Optionally, the method wherein the user device calculates a timing error based on at least one of cell specific RS, user device specific RS and positioning RS.

Optionally, the method further comprises using PDCCH to compensate for the timing error.

Optionally, the method further comprises receiving a synchronization signal through RRC from the primary cell.

Optionally, the method further comprises receiving a synchronization signal through MAC from the primary cell.

Optionally, the method wherein the synchronization signal comprises one or more LTE OFDM symbols.

Optionally, the method wherein a determination is made as to whether a synchronization signal is required and optionally as to the length of the synchronization signal, when the user device registers to the primary cell.

Optionally, the method wherein the user device measures a power level of Wifi signals on the channel of the unlicensed band and compares the power level to a predetermined threshold; wherein the user device holds off transmitting any signals on the channel if the measured power level is above the predetermined threshold.

Optionally, the method further comprises the user device decoding a WiFi header from the channel of the unlicensed band and wherein the user device holds off transmitting any signals on the channel for a duration specified in the WiFi header.

Optionally, the method further comprises the user device decoding a WiFi header from the channel of the unlicensed band and wherein the user device turns off its WiFi receiver if the measured power level is above the predetermined threshold.

Optionally, the method further comprises the user device decoding a WiFi header from the channel of the unlicensed band and wherein the user device turns off its LTE-U WiFi capable receiver for a duration specified in the header if the header indicates that the WiFi header has not originated from the secondary LTE cell.

Optionally, the method further comprises determining from received LTE DCI whether a detected WiFi header has originated from the secondary LTE cell, and if it has not originated from the secondary LTE cell, turning off its LTE-U WiFi capable receiver for the rest of the duration specified in the header.

According to a second aspect there is provided a computer readable medium as defined in claim 14 comprising instructions that when executed on a processor cause the processor to carry out the method.

According to a third aspect there is provided a user device as defined in claim 15 arranged to carry out the method.

According to a fourth aspect there is provided a method of transmitting LTE data in a channel of an unlicensed band comprising the steps of determining whether a channel of the unlicensed band is free to accept transmissions, determining an LTE subframe on which the transmission can commence, transmitting in the channel of the unlicensed band an LTE transmission frame comprising the LTE data starting at the determined subframe.

Optionally, the method further comprises determining whether the channel of interest comprises a frequency band utilized by WiFi.

Optionally, wherein determining whether a channel of the unlicensed band is free to accept transmissions comprises measuring a power level of transmission on a channel of the unlicensed band and comparing to a predetermined threshold.

Optionally, wherein determining whether a channel of the unlicensed band is free to accept transmissions comprises detecting a WiFi header on a channel of the unlicensed band.

Optionally, wherein if a channel of the unlicensed band is free to accept transmissions, formulating a pseudo WiFi header comprising a signal field where the signal field defines a duration longer than the LTE transmission frame to be transmitted.

Optionally, the method wherein the LTE transmission frame comprises a padding frame to keep the unlicensed channel busy until the determined subframe.

Optionally, the method wherein a plurality of pseudo WiFi headers are transmitted on adjacent WiFi channels of the unlicensed band.

Optionally, the method further comprises determining a reception offset between a primary channel comprising standard LTE transmission and a secondary channel comprising the LTE transmission in a channel of an unlicensed band.

Optionally, the method further comprises adding a synchronization signal to the LTE transmission frame, the synchronization signal comprising LTE OFDM symbols.

Optionally, the method wherein determining the LTE subframe upon which the transmission can commence comprises determining the first LTE subframe subsequent to the channel becoming free.

Optionally, the method wherein determining the first LTE subframe subsequent to the channel becoming free comprises determining the first LTE subframe subsequent to the channel becoming free and the transmission of any pseudo WiFi header and/or LTE synchronization field.

Optionally, the method wherein the padding frame comprises an integer number of LTE OFDM symbols transmitted after the time when the channel became free and after the transmission of any pseudo WiFi header and/or LTE synchronization field Optionally, the method wherein the padding frame further comprises additional padding signals to fill the gap between the last LTE OFDM padding symbol and the determined subframe.

According to a fifth aspect there is provided a computer readable medium comprising instructions that when executed on a processor cause the processor to carry out the method of the fourth aspect and optionally any optional steps.

According to a sixth aspect there is provided an LTE eNodeB arranged to carry out the method of the fourth aspect and optionally any optional steps.

With all the aspects, preferable and optional features are defined in the dependent claims.

The term LTE-U as used herein refers to LTE that has been modified and extended to operate in unlicensed bands.

BRIEF DESCRIPTION OF THE DRAWINGS

Embodiments will now be described, by way of example only, and with reference to the drawings in which:

FIG. 7 illustrates a method of initiating LTE usage in an unlicensed band;

FIG. 8 illustrates formulation of the optional WiFi Protection Header;

FIG. 9 illustrates formulation of the optional synchronization signal;

FIG. 10 illustrates a method of receiving LTE data in an unlicensed band at a UE;

FIG. 11 illustrates steps carried out at a UE in relation to channel measurement and reporting;

FIG. 12 illustrates steps carried out at a UE in relation to Wifi transmission; and FIG. 13 illustrates steps carried out at a UE in relation to optional synchronisation.

In the figures, like elements are indicated by like reference numerals throughout.

DETAILED DESCRIPTION OF THE INVENTION

Figure 1:
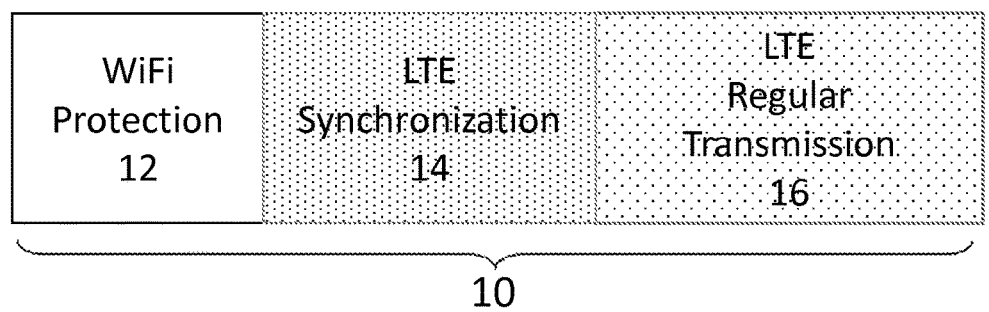
FIG. 1 illustrates a structure of an LTE-U transmission frame according to an embodiment.

Disclosed herein is a scheme to support an LTE extension to unlicensed bands using carrier aggregation, where the primary carrier is operating in a licensed band and one or several secondary carriers may be in unlicensed bands. A focus is the modification and extensions to apply to the LTE standard to support such secondary carriers in unlicensed bands. In addition to the LTE standard mechanisms, modifications are described herein.

The unlicensed spectrum may be used for a DL only LTE channel, where the traffic only goes from the eNB to the UE. The UL traffic uses the primary carrier operated in a licensed band in the known LTE manner. Modifications are applied at the eNB and at the UE compared to legacy LTE equipment.

An LTE-U capable eNB is responsible for listening to the unlicensed channel and performing listen-before-talk (LBT) before transmitting, as required for the fair use of the channel.

In order not to interfere with other users, all the usual LTE periodic transmissions are disabled in an unlicensed band outside of LTE transmissions (see below):

The Primary Synchronization Signal (PSS) and the Secondary Synchronization Signal (SSS) are the synchronization sequences used in legacy LTE to support UE synchronization to the cell. Moreover, from PSS and SSS, the UE is able to derive the physical cell identifier (cellID). In order to minimize interference with other users in the unlicensed band, PSSS/SSS are not transmitted. Synchronization on a secondary unlicensed channel is performed as described below instead; the cellID is provided to a UE through unicast data on the primary channel (and received at step 100 of FIG. 10 which illustrates a method of receiving LTE data in an unlicensed band at a UE);

The Physical Broadcast Channel (PBCH) in legacy LTE is the channel which carries the information for initial access to the cell: the LTE System Information (SI). In order not to interfere with other users, it is not transmitted. As the unlicensed channel is a secondary cell, the SI is provided to a UE as unicast data on the primary channel (and received at step 102 of FIG. 10);

Reference signals (RS), also called pilots, are not transmitted in unused frames, except possibly for fine time synchronization, as described below.

The end result is that when no user data transmission occurs on the unlicensed channel, no transmission is performed from the LTE-U eNB. This allows the typical LTE periodic transmissions on the unlicensed channel to be kept to a minimum, or at least reduced and hence LBT is more likely to return a result which is indicative of an eNB being allowed to transmit to a UE on the unlicensed channel.

The above schemes provide protection in unlicensed bands that WiFi and other technologies may use. LTE-U could be used in any unlicensed bands, not only the unlicensed bands also used by WiFi. The scheme described herein provides additional protection against WiFi specifically, which is justified by the widespread use of WiFi. WiFi use is common enough such that improved protection against Wifi interference in unlicensed bands is worth the added complexity of the LTE-U system.

The structure of an LTE-U transmission frame 10 from an eNB in an unlicensed band is shown in FIG. 1 (not to scale). The structure 10 comprises an optional WiFi protection header portion 12, an optional LTE synchronization portion 14, and an LTE regular transmission portion 16.

Each portion will be described in turn.

Optional WiFi Protection Header 12

The regular LBT process comprises comparing the measured power level on the channel at issue to a predetermined threshold T, and uses the channel if this power is below T.

The main technology used today in the 5 GHz band is WiFi. In addition to T, WiFi has a second power threshold W (higher than T), above which the receiver can demodulate a valid WiFi header. When the power level is between T and W, a WiFi device cannot demodulate the header but will also consider the channel as used. This provides extra protection to a device transmitting a WiFi compatible header at the start of its transmission against other WiFi users in the band.

Per the IEEE 802.11-2012 specification, a WiFi device must consider the channel busy if detected power on a channel is above −62 dBm for a 20 MHz channel. If a Wifi preamble is detected, the threshold W is reduced to −82 dBm (although in practice implementations are much better than this and can detect a further 5 to 10 dB below).

FIG. 7 shows a method of initiating LTE usage in an unlicensed band by an eNB. At step 70, an eNB optionally determines whether an unlicensed channel of interest is in a frequency band utilized by WiFi, and hence whether to add an optional Wifi protection header 12. If there is no Wifi utilization, the method continues to step 72, otherwise, the method continues to step 80 of FIG. 8 where the power level on the unlicensed channel is measured as described in the previous paragraph.

Another benefit for WiFi devices is that the WiFi header indicates the length of transmission. Therefore after decoding a valid WiFi header, a WiFi device may stop reception (and optionally turn off its WiFi receiver) for the indicated transmission duration, as it knows that the channel will be used. This can be used to reduce the WiFi device power consumption.

Figure 2:
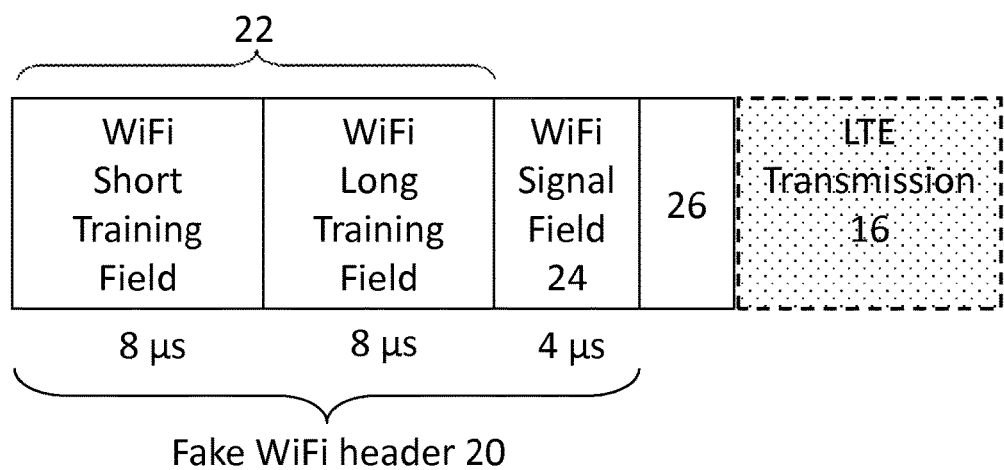
FIG. 2 illustrates a fake IEEE 802.11a header according to an embodiment.

As an example for the 5 GHz band, a fake IEEE 802.11a header 20 as shown in FIG. 2 (not to scale). The header may comprise at least one of a regular preamble field 22 and a signal field 24 and may be added at the start of the LTE-U eNB transmission portion 16 (step 82 of FIG. 8) to offer increased protection against WiFi interference. The time durations of the preamble and signal field as defined by the 802.11-2012 standard are included in the figure for completeness.

The WiFi signal field 24 may optionally be followed by padding field 26 (step 84 of FIG. 8) used to keep the channel busy as further described in the LTE Regular Transmission Section of this specification.

Figure 3:
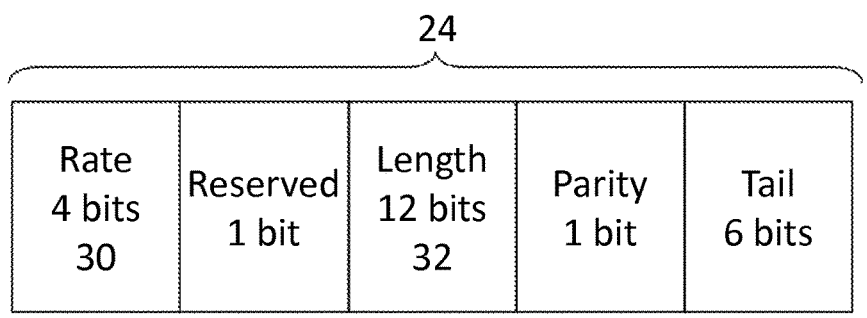
FIG. 3 illustrates a Wifi signal field.

The WiFi signal field 24 is typically used to indicate the modulation and coding scheme (MCS) and the length of the associated WiFi transmission as shown in FIG. 3 (not to scale). The bit size for each portion as defined by the 802.11-2012 specification is shown for completeness.

The "rate" field portion 30 provides the WiFi MCS, and "length" portion 32 provides an amount of transmitted data in bytes. From these two pieces of information, a WiFi receiver can compute a transmission length corresponding to the duration required to transmit a well formed WiFi frame at the indicated MCS containing the indicated amount of data bytes. A WiFi receiver successfully decoding such a preamble will consider the channel as busy, and will not try to transmit, over this duration. Decoding this limited WiFi header is sufficient for any WiFi device to set its network access vector (NAV), as per the IEEE 802.11 standard. This standard behaviour of a WiFi device will, in effect, protect an unlicensed channel for LTE use.

Any transmission will provide protection against any technology that supports LBT, including WiFi. The above provides additional protection against WiFi use in an unlicensed channel.

An LTE-U eNB can take advantage of this by using rate and length values corresponding to a duration that is typically just larger than the coming LTE transmission. These values are unrelated to any WiFi transmission, so a WiFi device will fail to decode any field after the "signal" header field 24. This has no unwanted consequence, as this partial header decoding is sufficient to mark the channel as used for the indicated duration and provide protection to the LTE-U transmission.

For a given LTE-U transmission of duration X, several combinations of rate and length can provide a sufficient protection during this period. The actual combination used is of no importance, and the eNB may simply pick a combination giving duration of protection higher than but as close as possible to X.

A WiFi protection has been shown for an 802.11a header for the 5 GHz band. The same scheme may be used with an 802.11b or 802.11g header in the 2.4 GHz band, or any other WiFi version header format. The main interest of LTE-U is in using the oldest commonly used WiFi header format for the used unlicensed band, in order to obtain unlicensed WiFi protection from the largest portion of WiFi devices.

When the LTE eNB occupies more than 20 MHz, by using carrier aggregation in unlicensed bands for example, the LTE-U eNB, at step 86, can send several such headers 20 on adjacent WiFi channels to cover the full LTE-U bandwidth. This is similar to what is done to handle larger 802.11n or 802.11 ac WiFi channels. For example, in 802.11 ac the minimum bandwidth is 20 MHz. The WiFi preamble is transmitted on 20 MHz, and larger channels. For example, 40, 80 and up to 160 MHz are handled by sending several headers in adjacent frequencies. For LTE the maximum bandwidth is 20 MHz. Therefore, typically, the 20 Mhz WiFi bandwidth is sufficient for the LTE-U signal bandwidth. If more LTE-U BW is needed, adjacent WiFi channels may be used.

The fake WiFi header is typically short (20 μs for the 802.11a header above and as shown in FIG. 2, compared to over 100 μs for a single LTE OFDM symbol) and offers higher protection to LTE, and so it typically makes a good usage of the channel, however its transmission is optional. The LTE-U eNB may decide dynamically to use such a header or not based on the observed actual WiFi interference in the used channel(s), for example, based on a power level measured in the unlicensed channel of interest as described in relation to step 80 of FIG. 8, or dependent on whether WiFi signals are detected by the eNB.

When the header has been formulated, method flow at the eNB returns to step 72.

Corresponding actions may be taken by a UE in relation to protection against Wifi interference and channel usage in the unlicensed band. The UE may measure power level on the channel at issue and compare to a predetermined threshold (step 120 of FIG. 12). The user device may then hold off transmitting any signals on the WiFi channel if the measured power level is above the predetermined threshold. The UE device may continue to hold off transmitting any signals on the WiFi channel while the measured power level remains above the predetermined threshold. The UE may turn-off its WiFi receiver for the same duration. The UE may measure the power level at any time. The UE may decode a WiFi header on the channel at issue and may hold off transmitting any signals on the channel for the (transmission) duration specified in the header (step 122 of FIG. 12). The UE may turn-off its WiFi receiver for the same duration. The signals on the WiFi channel referred to may be unrelated to LTE transmission.

In the following, the term LTE-U WiFi capable receiver is used to describe a receiver that is capable of receiving LTE-type transmissions in the WiFi band. This could comprise at least one of a standard WiFi receiver, a hybrid LTE receiver with WiFi band capability or a specific LTE-U capable receiver that can operate in the WiFi band.

In order that the UE does not turn off its WiFi receiver when a WiFi based LTE-U transmission on the channel is meant for the UE, the UE may determine whether the WiFi header has originated from the LTE-U eNB or another WiFi device (a station, STA or access point, AP as would be understood) in the following manner:

1. The UE may wait for the expected PDCCH signals according to standard LTE transmission (see appropriate section later on in this specification). If after the PDCCH there is no LTE allocation (no valid DCI), the LTE-U UE can determine that the WiFi transmission is not from the LTE-U eNB in question and turn off its LTE-U WiFi capable receiver for the rest of the duration specified in the header.

Approach 1 may be used based on heuristics (when a reception level is perceived to be good enough for example) because if the DCI decoding should fail, the UE may miss all other LTE subframes in the particular transmission.

2. In a true WiFi header, more information exists regarding the desired destination of the coming WiFi transmission (WiFi MAC addresses etc as would be understood). If a UE detects such information, it is known that the WiFi transmission is not originating from an LTE-U eNB and therefore, the UE may turn off its LTE-U WiFi capable receiver.

The two approaches may be carried out in parallel, with the first successful 'match' causing a power down of the WiFi receiver in the UE.

With approach 1, additional LTE-U eNBs sharing a single unlicensed channel may be put into low power mode for the duration that the LTE-U eNB serving the current transmission to the UE is transmitting. Approach 2 protects against true WiFi transmissions only.

Optional LTE synchronization 14

Preferably, the eNB should not transmit PSS/SSS synchronization signals in the unlicensed bands. Such signals are normally sent every 5 ms at a precise time and could collide with other users of the channel transmissions in the unlicensed bands. As described herein, the synchronization on the unlicensed channel may use a different scheme.

The synchronization on the secondary (unlicensed) channel may be carried out by taking the primary channel as reference. If, as would be common, the same eNB supports the unlicensed channel and the primary channel, then there is no timing difference between the unlicensed channel and the primary (as the communication path is almost identical) and hence the primary channel may provide an accurate synchronization reference. At step 72 of FIG. 7, the eNB optionally determines whether the primary channel and the secondary channel are situated at the same eNB. If they are, the difference in timing coming from using different frequencies is limited and can be addressed as part of the regular LTE channel estimation using reference signals (RS), and hence optional LTE synchronization is not required. The flow of the method therefore continues to step 74. For example, the reference signals, or pilots, are signals where the position in time and frequency, and original amplitude, is known. Therefore, a device such as device 48 to measure any offset in time, frequency and amplitude to estimate channel attenuation and frequency and timing offsets, and correct or compensate for those offsets accordingly. This is the standard process of channel estimation and compensation, and allows, in particular, the device 48 to track and correct small timing errors.

Figure 4:
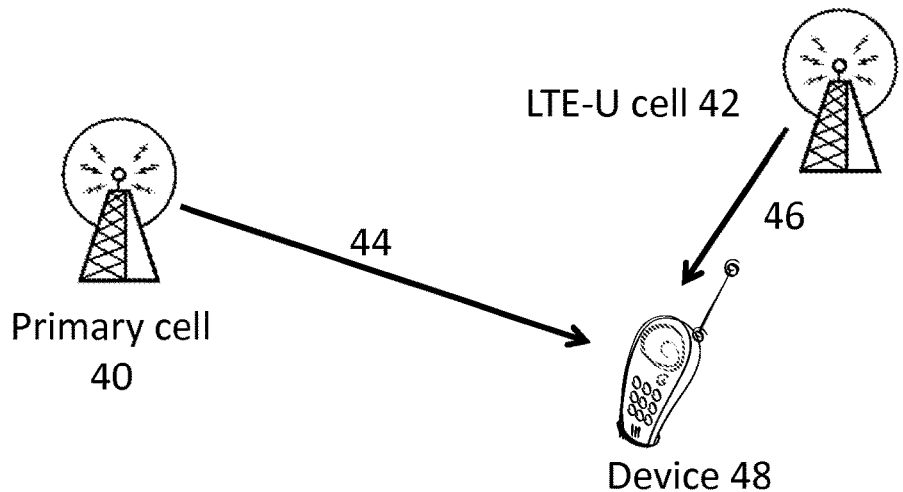
FIG. 4 illustrates the positions of a primary cell, a secondary cell and a UE device and the corresponding propagation delays.

If the primary channel is on a different eNB than the unlicensed channel and they are located at different sites, there will be a time offset related to the different propagation times between the two sites and the UE as would be understood. In this event, the flow of the method at the eNB therefore continues to step 90 of FIG. 9. The steps of FIG. 9 may be carried out again at any time as desired by the eNB, for example at a rate that is slower than every LTE transmission from the eNB. The steps of FIG. 9 may be carried out as an update to synchronization if channel parameters are detected as having changed since the last determination was made. An example of the relationship between positions of a primary cell, a secondary cell and a UE device 48 and the corresponding propagation delays are shown in FIG. 4. Primary cell 40 is at a different physical location than the LTE-U cell 42. Accordingly, propagation time 44 to from primary cell 40 to device 48 is different to propagation time 46 from LTE-U cell 42 to the same device 48. Both cells (40, 42) are synchronized, as per the LTE standard requirement, but the signals travel different distances to the device and so they are not perfectly aligned at the receiver device 48. Moreover the reception offset of such a device 48 can vary over time as the device moves, although the expected LTE-U usage is mostly of interest in high frequency bands and at low mobility. If the reception offset is large enough, typically higher than half of an LTE cyclic prefix (CP) duration such that the normal RS based time estimation and compensation is not sufficient, the LTE-U eNB can schedule a dedicated LTE-U synchronization signal 14 just before the actual data decoding starts as shown in FIG. 1. At step 90 the reception offset is determined. The maximum offset can be derived from the known positions of the primary and LTE-U cells and based on the maximum available distance from the primary or LTE-U cell of a UE. The LTE-U cell will typically have a lower maximum distance to the UE due to the communication scheme used (lower-power WiFi or other local communication scheme rather than the telephony network of the primary cell). The actual offset may be derived from the actual UE position, if available with high enough accuracy (the resolution of the UE location information, for example GPS, may be too large for the relatively short distance of the UE from the LTE-U cell).

Corresponding optional steps may be taken by the UE to aid determination of any synchronization signal by the eNB. At step 130 of FIG. 13, the UE may provide its geographical position to the primary LTE cell.

As the skilled person would understand there are two CP durations in the LTE standard, therefore the duration of the reception offset can be defined relative to the CP as the CP is the relevant reference for timing errors. The possible CP durations are defined by the LTE standard.

By way of background explanation, there are several types of reference signals or pilots defined by the LTE standard:

Cell specific RS are transmitted by the eNB at all times, and have characteristics that are independent of any UE (they are global to the cell of the eNB).

UE specific RS are used with beam-forming and are beam-formed towards a given UE. As such, they are only usable by the targeted UE.

Positioning RS are global in the same manner as cell specific RS, but have a specific pattern that allows a finer/higher precision timing error computation. Positioning RS are typically used for positioning applications, where the timing offset is used to derive a distance from the eNB. By using several cells, a position of a UE can be triangulated.

All the above types of RS may be used by the UE to compute a timing error based on at least one of cell specific RS, user device specific RS and positioning RS at step 132 of FIG. 13.

Even when the timing offset is compensated for optimal data reception, there may not be a need for a synchronization signal 14. The coming LTE subframe will include a PDCCH area before the PDSCH area, and it may be sufficient to use its RS to have a sufficient demodulation quality over the PDSCH area. It is up to the LTE-U network to consider this before determining whether a synchronization area 14 is needed, and if needed what its size should be. At step 92, a determination is made by the eNB as to whether a synchronization signal 14 is required, or whether the RS of the next LTE subframe will be sufficient for compensating for a reception timing offset. The LTE DL transmission is made of a sequence of subframes of 1 ms duration. The subframe starts with an area called PDCCH (Physical Downlink Control Channel) of 1 to 3 OFDM symbols, followed by the PDSCH (Physical DL Shared Channel). The PDCCH contains allocation information, but may not be used with carrier aggregation: the control information may be provided on the primary channel PDCCH instead. In this case the UE doesn't need to decode anything on the PDCCH, so its timing need not be perfect there. And the PDCCH contains RS too. So the UE can measure and compensate its timing error on the PDCCH (step 134 of FIG. 13) and be compensated enough for receiving on the PDSCH, if the residual timing error is small enough to be compensated by RS measurement from the PDCCH OFDM symbols. The supported residual timing error also depends on the encoding used on the PDSCH: a more robust modulation and coding scheme supports a higher residual error.

If it is determined that a synchronization signal 14 is required at step 92, the synchronization signal 14 may comprise a configurable minimum number of LTE OFDM symbols containing reference signals. The reference signals may be a mix of cell specific and UE specific, depending on the transmission mode used as would be understood. The chosen (minimum duration of the) synchronization signal 14 can be provided to the UE through Radio Resource Control (RRC) signaling from its primary eNB at step 94 of FIG. 9 and correspondingly received by the UE at step 136 of FIG. 13, and could be adjusted as needed. Further, any synchronization signal may be provided to the UE at the MAC level as would be understood. Depending on parameters collected or known by the eNB (for example, any one or more of cell size, mobility of the UE, past link quality on secondary channels of UE, nature of the environment (indoor, outdoor, rural, urban . . . ), the eNB may decide to allocate zero, one or more than one LTE OFDM symbols containing reference signals on the LTE-U transmission to support fine synchronization of the UE. Preferably, the chosen minimum duration of the synchronization signal 14 is typically decided by the eNB based on the site context (whether the primary and secondary are at the same or different sites), performance targets, channel conditions and/or potential error.

The synchronization period (the length of the synchronization signal 14) may be extended for synchronization purposes as explained in the LTE Regular Transmission Section of this specification. The device can then use the regular RS channel estimation to measure and compensate the timing offset with respect to the primary channel. Alternatively a specific RS pattern may be used in the synchronization process to improve the time estimation, for example by reusing the LTE positioning RS pattern (see 3GPP TS 36.211 R9 or later, section 6.10.4) or any new RS pattern that could be defined for the purpose of synchronization. Legacy LTE considers PSS, SSS and pilots (for example cell specific, UE specific, pilot for positioning) for—among other uses—the purpose of synchronization. The LTE-U scheme described herein may utilize those legacy pilot schemes to support synchronization in the unlicensed channel but does not preclude the definition of new pilot schemes explicitly dedicated for synchronization.

When the synchronization signal 14 has been formulated, method flow at the eNB returns to step 74.

LTE Regular Transmission 16

Figure 5:
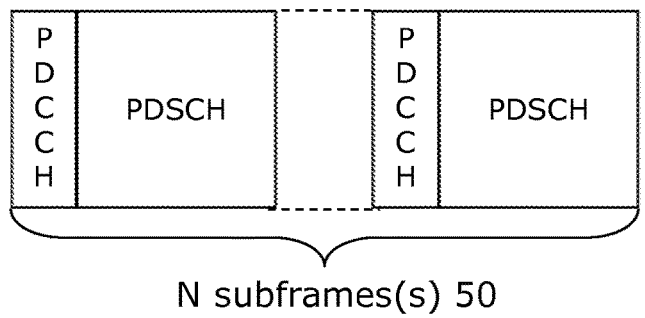
FIG. 5 illustrates LTE regular transmission portion.

The LTE regular transmission portion 16 is made of a standard succession of LTE subframes 50 as shown in FIG. 5.

The start of each subframe is aligned based on standard LTE synchronization which requires alignment between primary and secondary cell transmissions. During the regular transmission interval the LTE-U 42 sends a normal LTE signal, except possibly for small extensions as described below.

Figure 6:
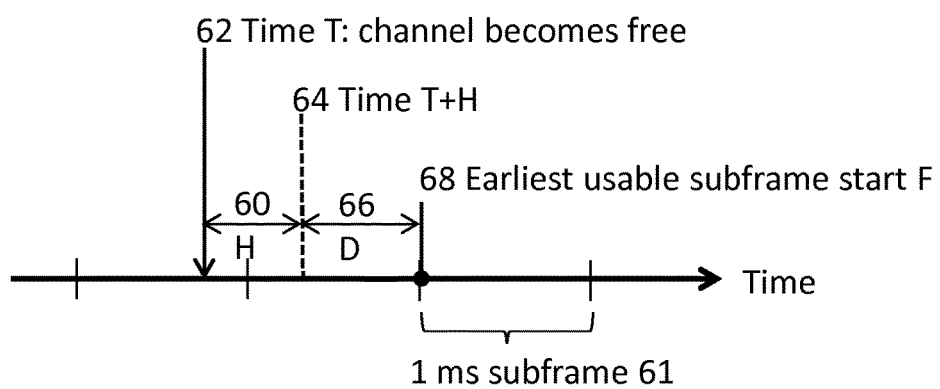
FIG. 6 illustrates a timing diagram of a WiFi header and synchronization period.

Because of the LTE frame alignment constraint (a frame on primary and secondary cells must be aligned), the first subframe cannot start at an arbitrary time, and is constrained by the LTE framing. When the unlicensed channel becomes free (determined at step 74, preferably with LBT and optionally, by way of detecting a WiFi header, for further protection of WiFi, as previously discussed), the LTE-U eNB 42 will compute which LTE subframe will start the regular transmission period based on the minimum WiFi header and synchronization period at step 76. FIG. 6 shows a timing diagram of a WiFi header and synchronization period. H denotes the optional LTE-U header duration 60 comprising the optional minimum WiFi protection header (without padding) and optional minimum LTE-U synchronization duration. The time axis of the timing diagram of FIG. 6 is shown relative to arbitrary 1 ms subframes 61 of regular LTE transmission. From the time T 62 when the unlicensed channel becomes free and usable by the LTE-U eNB 42, the regular transmission can start with the first subframe starting at or after the time T+H (64).

Because both the WiFi pseudo header and LTE synchronization period are optional, duration H (60) may be equal to zero. This does not change the process to find the first usable subframe start 68.

Let F (68) be the starting time of this first usable subframe. Typically F will be subsequent to time T+H (64), meaning there would be a gap between the end of a minimum header (if used) and the beginning of the first usable subframe. If the channel is left unused during this time, another device may start transmitting. Therefore, the LTE-U eNB 42 optionally fills this gap with padding signal sent at a similar power level as the LTE signal at step 78. Similar may be defined as the same average power spectral density as the LTE signal, or slightly larger. The aim is not to saturate a close-by UE (so not much more power), but to keep the channel busy as perceived by non-LTE far devices i.e. any device that may desire to transmit on the unlicensed channel of interest (so preferably should not be less power).

This padding may be made for example of additional synchronization symbols, and additional WiFi padding, or any waveform occupying the used channel at an appropriate power level to keep it busy as seen from other devices. Let D (66) be this duration (D=F−T−H) and O the duration of an LTE OFDM symbol, then for example:

N=floor(D/O) synchronization LTE OFDM symbols may be added to the LTE synchronization area, or if no synchronization area was required, then a synchronization area of N OFDM symbols can be created; (floor(x) being the function giving the first integer below x)

A WiFi padding signal of duration D−N×O can be used or, if no WiFi header is used, a padding signal of this duration can be transmitted starting at time T.

As can be seen, it is preferable to fill duration D as much as possible with OFDM symbols (N=floor(D/O)), as the RS they contain helps the UE perform channel estimation and compensation to improve reception performance. If duration D is not an integer number of OFDM symbols, the remaining gap (after padding with N OFDM symbols) may be filled with "useless" padding, such as a WiFi padding signal. The useless padding does not contribute to aiding LTE reception quality.

The LTE transmission portion 16 together with any optional WiFi Header portion 12 and synchronization portion 14 is transmitted on the unlicensed band of interest at step 79 and correspondingly received by the user device at step 104 of FIG. 10. Once the transmission has taken place, a further LTE transmission in an unlicensed band can be initiated in the same manner by returning to step 70.

The example above uses the duration D for synchronization as required, and fills the rest of the duration with redundant padding transmission. Any other split is possible as long as the channel is kept busy before the regular LTE transmission starts. An important property of this transmission scheme for unlicensed bands is that LTE transmissions are not continuous. Whereas in a licensed band the UE can rely on the cell specific RS to be transmitted at all times, in an unlicensed channel the RS are only transmitted as part of the synchronization and regular transmission period. This has an impact on the UE measurements (typically the Reference Signal Receive Power (RSRP), Reference Signal Received Quality (RSRQ), Channel Quality indicator (CQI), Precoding Matrix indicator (PMI) Rank indicator (RI)) normally based on RS and pertaining to transmission type measurements of the unlicensed channel (referred to at step 112 of FIG. 11 below). Moreover, using the regular LTE signaling, a device would only be aware of unicast transmission targeted at it. This would further reduce the period of time that a device could use to measure the channel, especially for terminals having no data scheduled over the secondary carrier at a given time but which needs to perform the measurements, in case of future allocation. The knowledge of an on-going allocation on the secondary carrier operated in the unlicensed spectrum helps the user device to perform measurement at the right time.

In order to remove this limitation, and let a UE perform measurements during all the subframes where the LTE-U eNB is transmitting, a new scheme is introduced (FIG. 11) where the PDCCH is used to indicate the used subframes to all active devices. By either introducing a new Radio Network Temporary Identifier (RNTI) dedicated to this signaling, or adding this function to existing broadcasted Downlink Control Information (DCI), the device could receive DCI based information to indicate the following LTE-U events on the unlicensed channel:

The unlicensed transmission starts in the associated subframe;

The unlicensed transmission stops in the associated subframe;

The associated subframe is used on the associated subframe.

The subframe associated to the DCI is defined as per the LTE standard (in the DL it is the same subframe containing the DCI for example). The scheduling of such DCI information can be done using cross-scheduling as per the standard LTE carrier aggregation scheme if desired.

The latter option is more efficient when a single subframe is used. Alternatively, only events 1 and 2 could be used (the subframe is partially used). Or only event 3 could be used (the subframe is used or not used). In the end, the goal is to provide very low latency reliable broadcast information on the actual use of the unlicensed channel. At step 110 of FIG. 11, the UE may determine from PDCCH whether an LTE subframe is used, partially used or not used.

Based on this information, the UE may leverage all the used LTE subframes for measurements (step 112 of FIG. 11). Based on information in the header, it may also deduce time periods when the LTE-U eNB is inactive and perform channel measurement to assess interference from other devices and technologies and noise level in the channel (step 114 of FIG. 11).

With standard periodic reporting, the UE measures LTE subframes and regularly sends a measurement report to the eNB. Aperiodic reporting can be used in unlicensed bands, but periodic reporting is not well suited due to the intermittent use of the channel. A modified periodic reporting can be carried out on the primary channel, based on the transmitted LTE subframes only.

With LTE-U, the channel may not be used by the eNB for arbitrary durations. With periodic reporting the reports over a time comprising no LTE use ("LTE empty") durations or where part of the period the report is concerned with comprises an "LTE empty" situation, a modified periodic reporting can be utilised at step 116 of FIG. 11. For example, a report may only be computed over LTE subframes that are used (known to the eNB). There would be no need to send a report over fully unused durations (when the LTE subframes are empty).

LTE-U brings several advantages and benefits:

LTE has a higher spectral efficiency than WiFi;

Unlicensed bands can be leveraged using a single technology, potentially simplifying the client devices and avoiding the complexity of inter-RAT (radio access technology) integration on the network side.

Minimising change required in both the eNB and UE implementations.

Further, for client devices, the scheme described herein reduces cost by opening the possibility to remove WiFi capability. Removing WiFi would reduce component count and cost as well as PCB real-estate requirements. Further, users obtaining WiFi from an operator box that would also support LTE-U could buy a cheaper UE (for example a smartphone) with LTE-U capability instead of WiFi.

The scheme also lowers power consumption as present schemes where LTE and WiFi can be used together require extra power to cope with added interference and data integrity. This is not required with an LTE-U system that is able to share unlicensed channels (with other technologies such as WiFi) in a fair manner.

The order that the various steps are executed may be swapped or changed in any manner, for example, determining whether the unlicensed band is in a WiFi spectrum (step 70) and whether synchronization is required (step 72) may be swapped. Whether or how much synchronization is required may not need to be assessed for each transmission. It could be done once when a UE registers to the cell for example. Further, optional steps 120 and 122 may be carried out by a UE before step 100 of FIG. 10 and optional steps 130 to 136 may be carried out before or after steps 120 and 122, and before step 100.

The various methods described above may be implemented by a computer program. The computer program may include computer code arranged to instruct a processor to perform the functions of one or more of the various methods described above. The computer program and/or the code for performing such methods may be provided to an apparatus, such as a processor, on a computer readable medium or computer program product. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

An apparatus such as a processor may be configured in accordance with such code to perform one or more processes in accordance with the various methods discussed herein. Such an apparatus may take the form of a data processing system. Such a data processing system may be a distributed system. For example, such a data processing system may be distributed across a network.

While this invention has been particularly shown and described with references to example embodiments thereof, it will be understood by those skilled in the art that various changes in form and details may be made therein without departing from the scope of the invention encompassed by the appended claims.

What is claimed is:

1. A method of receiving long-term evolution (LTE) data by a user device, the data being transmitted on a channel of an unlicensed band, the method comprising:
   receiving a cell ID from a primary LTE cell;
   receiving system information from the primary LTE cell for access to an unlicensed channel;
   receiving LTE user plane and control plane data on the channel of an unlicensed band; wherein the unlicensed channel is served by a secondary LTE cell identified by the received cell ID and that is of a different eNodeB than the primary LTE cell;
   the method further comprising the user device decoding a WiFi header from the channel of the unlicensed band and wherein the user device turns off its LTE in unlicensed spectrum (LTE-U) WiFi capable receiver for a duration specified in the header if the header indicates that the WiFi header has not originated from the secondary LTE cell.

2. The method of claim 1 wherein the cell ID and system information is received as unicast data.

3. The method of claim 1 further comprising
determining from physical downlink control channel (PDCCH) whether an LTE transmission subframe on the unlicensed channel is one of used, partially used and not used.

4. The method of claim 1 wherein the user device determines one or more transmission measurements of the unlicensed channel in relation to transmission on that channel based on used and/or partially used LTE transmission subframes on the unlicensed channel.

5. The method of claim 4 wherein the user device sends data indicative of the one or more transmission and/or channel measurements to the primary cell.

6. The method of claim 1 wherein the user device determines one or more channel measurements of the unlicensed channel in relation to interference and/or noise on that channel based on unused LTE transmission subframes.

7. The method of claim 1 wherein the user device sends its geographical position to the primary LTE cell.

8. The method of claim 1 wherein the user device calculates a timing error based on at least one of cell specific reference signal (RS), user device specific RS and positioning RS.

9. The method of claim 8 wherein a determination is made as to whether a synchronization signal is required, when the user device registers to the primary cell.

10. The method of claim 1 further comprising receiving a synchronization signal through radio resource control (RRC) or media access control (MAC) from the primary cell.

11. A non-transitory computer readable medium comprising instructions that when executed on a processor cause the processor to carry out the method of claim 1.

12. A user device arranged to carry out the method of claim 1.

13. A method of receiving long-term evolution (LTE) data by a user device, the data being transmitted on a channel of an unlicensed band, the method comprising:
receiving a cell ID from a primary LTE cell;
receiving system information from the primary LTE cell for access to an unlicensed channel;
receiving LTE user plane and control plane data on the channel of an unlicensed band; wherein the unlicensed channel is served by a secondary LTE cell identified by the received cell ID and that is of a different eNodeB than the primary LTE cell;
the method further comprising the user device determining from LTE downlink control information (DCI) whether a detected WiFi header has originated from the secondary LTE cell, and if it has not originated from the secondary LTE cell, turning off its LTE-U WiFi capable receiver for the rest of the duration specified in the header.

14. The method of claim 13 wherein the cell ID and system information is received as unicast data.

15. The method of claim 13 further comprising
determining from physical downlink control channel (PDCCH) whether an LTE transmission subframe on the unlicensed channel is one of used, partially used and not used.

16. The method of claim 13 wherein the user device determines one or more transmission measurements of the unlicensed channel in relation to transmission on that channel based on used and/or partially used LTE transmission subframes on the unlicensed channel.

17. The method of claim 16 wherein the user device sends data indicative of the one or more transmission and/or channel measurements to the primary cell.

18. The method of claim 13 wherein the user device determines one or more channel measurements of the unlicensed channel in relation to interference and/or noise on that channel based on unused LTE transmission subframes.

19. The method of claim 13 wherein the user device sends its geographical position to the primary LTE cell.

20. The method of claim 13 wherein the user device calculates a timing error based on at least one of cell specific reference signal (RS), user device specific RS and positioning RS.

21. The method of claim 20 wherein a determination is made as to whether a synchronization signal is required, when the user device registers to the primary cell.

22. The method of claim 13 further comprising receiving a synchronization signal through radio resource control (RRC) or media access control (MAC) from the primary cell.

23. A non-transitory computer readable medium comprising instructions that when executed on a processor cause the processor to carry out the method of claim 13.

24. A user device arranged to carry out the method of claim 13.

* * * * *